US009098979B2

(12) United States Patent
Cong et al.

(10) Patent No.: US 9,098,979 B2
(45) Date of Patent: Aug. 4, 2015

(54) SCANNING-PRINTING INTEGRATED MACHINE FOR LOTTERY TICKET PRINTING AND CASHING

(75) Inventors: Qiangzi Cong, Shandong (CN); Min Yang, Shandong (CN); Fengbo Xu, Shandong (CN); Tianxin Jiang, Shandong (CN); Xiaojie Tang, Shandong (CN)

(73) Assignee: SHANDONG NEW BEIYANG INFORMATION TECHNOLOGY CO., LTD. (CN)

( * ) Notice: Subject to any disclaimer, the term of this patent is extended or adjusted under 35 U.S.C. 154(b) by 273 days.

(21) Appl. No.: 13/639,920

(22) PCT Filed: Nov. 16, 2010

(86) PCT No.: PCT/CN2010/078806
§ 371 (c)(1),
(2), (4) Date: Oct. 8, 2012

(87) PCT Pub. No.: WO2011/124068
PCT Pub. Date: Oct. 13, 2011

(65) Prior Publication Data
US 2013/0038905 A1 Feb. 14, 2013

(30) Foreign Application Priority Data
Apr. 9, 2010 (CN) .......................... 2010 1 0145944

(51) Int. Cl.
*G06K 13/00* (2006.01)
*G07F 17/32* (2006.01)
(Continued)

(52) U.S. Cl.
CPC .............. *G07F 17/329* (2013.01); *G07F 17/42* (2013.01); *H04N 1/0062* (2013.01);
(Continued)

(58) Field of Classification Search
CPC .................. H04N 2201/0094; H04N 1/32133; G06K 15/02; G06K 15/00
USPC .................................. 235/454, 470, 475, 476
See application file for complete search history.

(56) References Cited

U.S. PATENT DOCUMENTS
4,350,987 A * 9/1982 Hanagata et al. .............. 347/218
4,677,553 A * 6/1987 Roberts et al. .................. 463/17
(Continued)

FOREIGN PATENT DOCUMENTS
| CN | 1796237 | 7/2006 |
|---|---|---|
| CN | 101662554 | 3/2010 |
| CN | 101673417 | 3/2010 |
| CN | 101815153 | 8/2010 |

OTHER PUBLICATIONS
International Search Report for International Patent Application No. PCT/CN2010/078806 mailed Feb. 10, 2011.

*Primary Examiner* — Paultep Savusdiphol
(74) *Attorney, Agent, or Firm* — McAndrews, Held & Malloy, Ltd.

(57) ABSTRACT

The invention discloses a scanning-printing integrated machine for lottery ticket printing and cashing, comprising a first passage connected with an external paper inlet, a second passage connected with a paper house, a third passage connected with a paper outlet, and a control device, wherein a paper outlet of the first passage and a paper outlet of the second passage meet together at the third passage, at least one pair of delivery rollers is arranged in the first passage, a first printing mechanism and a paper cutting mechanism are arranged in the second passage, a scanning mechanism and a second printing mechanism for printing mark information on a medium are in sequence arranged in the third passage, wherein the control device judges the validity of the medium according to medium images collected by the scanning mechanism, and controls the printing operation of the second printing mechanism according to the judgment result. The scanning-printing integrated machine of the invention can not only achieve printing and cashing of the lottery tickets, but also detect the integrality of the printed contents.

12 Claims, 8 Drawing Sheets

(51) Int. Cl.
  *G07F 17/42*   (2006.01)
  *H04N 1/00*    (2006.01)
  *H04N 1/12*    (2006.01)
  *G07B 1/00*    (2006.01)

(52) U.S. Cl.
  CPC ...... *H04N 1/00588* (2013.01); *H04N 1/00591* (2013.01); *H04N 1/00596* (2013.01); *H04N 1/00602* (2013.01); *H04N 1/00615* (2013.01); *H04N 1/00631* (2013.01); *H04N 1/00668* (2013.01); *H04N 1/00679* (2013.01); *H04N 1/1215* (2013.01); *H04N 1/1225* (2013.01); *G07B 1/00* (2013.01)

(56) References Cited

U.S. PATENT DOCUMENTS

| | | | | |
|---|---|---|---|---|
| 5,091,634 | A  * | 2/1992  | Finch et al. | 235/375 |
| 5,850,246 | A  * | 12/1998 | Maslanka et al. | 347/197 |
| 5,927,876 | A  * | 7/1999  | Fox | 400/579 |
| 6,350,005 | B1 * | 2/2002  | Asai et al. | 347/19 |
| 6,875,105 | B1 * | 4/2005  | Behm et al. | 463/17 |
| 2002/0109865 | A1* | 8/2002  | Gatto et al. | 358/471 |
| 2004/0265032 | A1* | 12/2004 | Furihata et al. | 400/693 |
| 2005/0127160 | A1* | 6/2005  | Fujikawa | 235/379 |
| 2006/0183554 | A1* | 8/2006  | Piazzai et al. | 463/46 |
| 2007/0091377 | A1* | 4/2007  | Smith | 358/3.28 |
| 2012/0120433 | A1* | 5/2012  | Cong et al. | 358/1.13 |

* cited by examiner

Fig. 1

--Prior Art--

SCANNING-PRINTING INTEGRATED MACHINE FOR LOTTERY TICKET PRINTING AND CASHING

The invention claims the priority of Chinese invention patent application No. 201010145944.X, entitled "Scanning-printing Integrated Machine for Lottery Ticket Printing and Cashing", filed with the Patent Office of the People's Republic of China on Apr. 9, 2010.

TECHNICAL FIELD OF THE INVENTION

The invention relates to a scanning-printing integrated machine for lottery ticket printing and cashing.

BACKGROUND OF THE INVENTION

With the development of lottery industry, demands on lottery ticket printers become more and more. Traditional lottery ticket printers only have a function of printing, therefore, at the lottery ticket sales outlets, it is necessary to have a printer for lottery ticket printing, and also to have a scanning-printing integrated machine for lottery ticket cashing. Thus, the equipment cost of lottery ticket sellers is increased, and the lottery ticket selling equipment occupies large space because of its large size.

Figure 1:
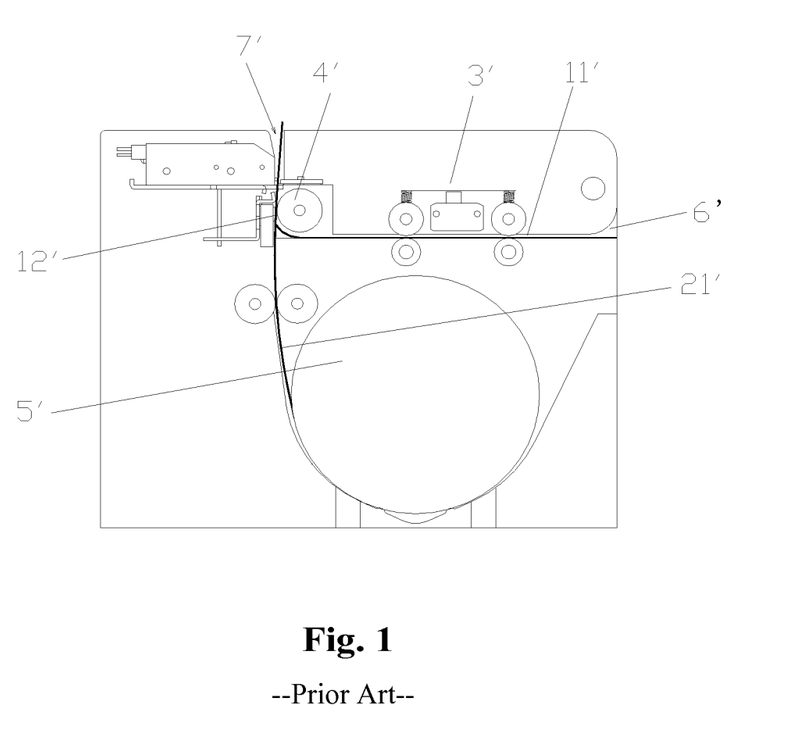
FIG. 1 is a schematic view of a traditional scanning-printing integrated machine.

Chinese invention patent application No. 200910141896.4 discloses a scanning-printing integrated machine, as shown in FIG. 1, the printing-scanning integrated machine, in which a scanning passage 11' and a transition passage 21' for supplying the printing medium meet together at a paper feed end of a printing passage 12', can achieve the function of lottery ticket printing and lottery ticket cashing.

When the scanning-printing integrated machine is executing the operation of cashing, first insert the lottery ticket to be cashed into the scanning passage 11' from a paper inlet 6', acquire the information of the lottery ticket to be cashed by a scanning device 3', then the lottery ticket to be cashed is fed into the printing passage 12' from the scanning passage 11' and discharged from a paper outlet 7' after an invalid mark is printed on the cashed lottery ticket by a printing device 4'. When the scanning-printing integrated device is executing the operation of printing, the printing medium is delivered from a paper holding device 5', via a transition passage 21', to the printing passage 12', the printed medium is discharged from the paper outlet 7' after the printing device 4' printed information on the printing medium, and unprinted medium in the printing passage 12' returns into the transition passage 21'.

Although the above technical solution provides a scanning-printing integrated machine for lottery ticket printing and cashing, like traditional printers, the machine provided by the solution can not detect the integrality of the printed contents, even if the ticket is invalidated due to incomplete printed contents of the ticket, it is also regarded that a valid ticket is printed out and the number of the ticket is registered in the software system of the host. Therefore, the ticket bought by the user may not be used normally because of incomplete contents such as bar code, key number and amount of money of the ticket. It will seriously harm the property interests of the ticket user, and cause unnecessary dispute between the ticket user and the ticket distributor.

SUMMARY OF THE INVENTION

The purpose of the invention is to provide a scanning-printing integrated machine for lottery ticket printing and cashing, which can not only achieve the function of the lottery ticket printing and cashing, but also detect the integrality of the printed contents.

Therefore, the invention provides a scanning-printing integrated machine, comprising a first passage connected with an external paper inlet, a second passage connected with a paper house, a third passage connected with a paper outlet, and a control device, wherein the paper outlet of the first passage and the paper outlet of the second passage meet together at the third passage, at least one pair of delivery rollers is arranged in the first passage, a first printing mechanism and a paper cutting mechanism are arranged in the second passage, a scanning mechanism and a second printing mechanism for printing mark information on a medium are in sequence arranged in the third passage, wherein the control device judges the validity of the medium according to medium images collected by the scanning mechanism, and controls the printing operation of the second printing mechanism according to the judgment result.

Further, the scanning-printing integrated machine may be in such a structure, that is, it comprises a lower machine body, a first cover hinged at the front side of the lower machine body and a second cover hinged at the back side of the lower machine body, wherein the first passage is formed between the first cover and the second cover, the second passage is formed between the second cover and the lower machine body, and the third passage is formed between the first cover and the lower machine body.

Further, the second cover extends on the top of the first cover, the first passage comprises a substantially horizontal extended segment and an arc extended segment which extends and transits towards the third passage, and the third passage obliquely extends downwards.

Further, an end face of the first cover is opposite to an end face of the second cover, and an external paper inlet of the first passage formed between the first cover and the second cover is located on the upper surface of the machine.

Further, the scanning-printing integrated machine also may be in such a structure, that is, it comprises a lower machine body, a first cover hinged at the front side of the lower machine body and a second cover hinged at the back side of the lower machine body, wherein the first passage is formed between the first cover and the lower machine body, the third passage is formed between the second cover and the first cover, and the second passage is formed between the second cover and the lower machine body.

Further, a guide plate is arranged at the cross of the first passage, the second passage and the third passage, wherein the guide plate has a first side face apart from the first cover at an interval, a second side face contacting with the second cover, and a third side face apart from the lower machine body at an interval.

Further, the guide plate is hinged at the first cover and an elastic supporter is arranged between the guide plate and the first cover.

Further, the elastic supporter is a spring leaf fixedly mounted on the guide plate.

Further, the scanning-printing integrated machine further comprises a print head raising mechanism of the second printing mechanism, and the print head raising mechanism comprises a bracket movably connected with the first cover and a driving mechanism for driving the bracket to move, wherein the print head of the second printing mechanism is fixedly mounted on the bracket.

Further, the bracket comprises a print head mounting base hinged with the first cover and a driving plate extending on the top of the print head mounting base, and the driving mechanism comprises a cam in transmission fit with the driving plate and a driving motor.

Further, the first passage comprises a substantially horizontal extended segment and an arc extended segment which extends and transits towards the third passage, and the third passage obliquely extends downwards. Wherein, the third passage obliquely extending downwards makes the third passage joined with the first passage and the second passage smoothly, and is helpful to reduce the size of the machine in the length direction.

The scanning-printing integrated machine according to the invention can not only achieve the function of the lottery ticket printing and cashing, but also, at the same time, collect images of the printing medium such as printed lottery ticket and the scanning medium such as lottery ticket to be cashed by using the scanning mechanism, print a mark on the printing medium and the scanning medium by using the second printing mechanism, and realize the function of cashing and detecting the integrity of the printed contents.

Further, the scanning-printing integrated machine of the invention is constructed in such a manner that the first cover and the second cover are hinged with the front and back ends of the lower machine body, the structure is compact and convenient to be maintained.

Further, the first cover has a movably connected guide plate, which not only makes the replacement of the printing medium conveniently, but also makes the printing medium and the scanning medium run smoothly at the cross of three passages.

Further, the print head raising mechanism connected with the second printing mechanism reduces friction to the print head of the second printing mechanism from the printing medium and the scanning medium, and improves the reliability of the print head of the second printing mechanism.

Further, the control device has a medium validity judgment module that is located outside the scanning-printing integrated machine and used for judging whether the medium is valid.

Besides the above-mentioned purposes, features and advantages, other purposes, other features and advantages of the invention will be further described in details with reference to drawings.

BRIEF DESCRIPTION OF THE DRAWINGS

Drawings, which form one part of the specification and are used for further understanding the invention, show preferred embodiments of the invention and are used for describing the principle of the invention with the specification. In the drawings.

DETAILED DESCRIPTION OF THE EMBODIMENTS

The embodiments of the invention will be described in details below with reference to drawings, but the invention may be implemented in various different ways defined and covered by the claims.

Figure 2:
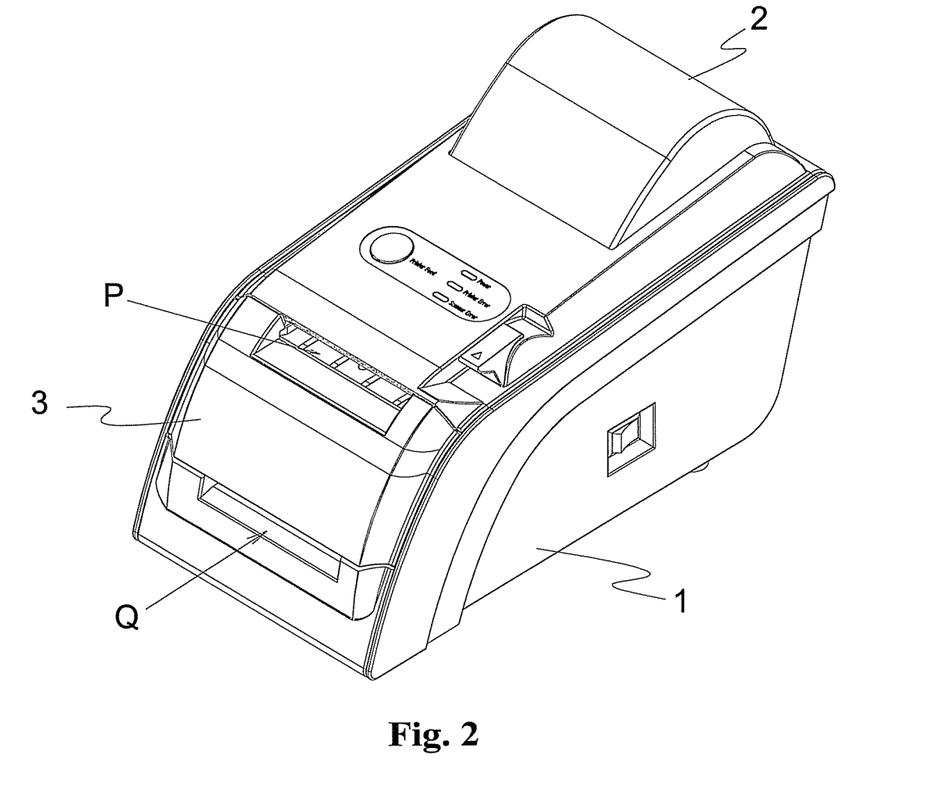
FIG. 2 is a solid view of a scanning-printing integrated machine according to one embodiment of the invention.
Figure 3:
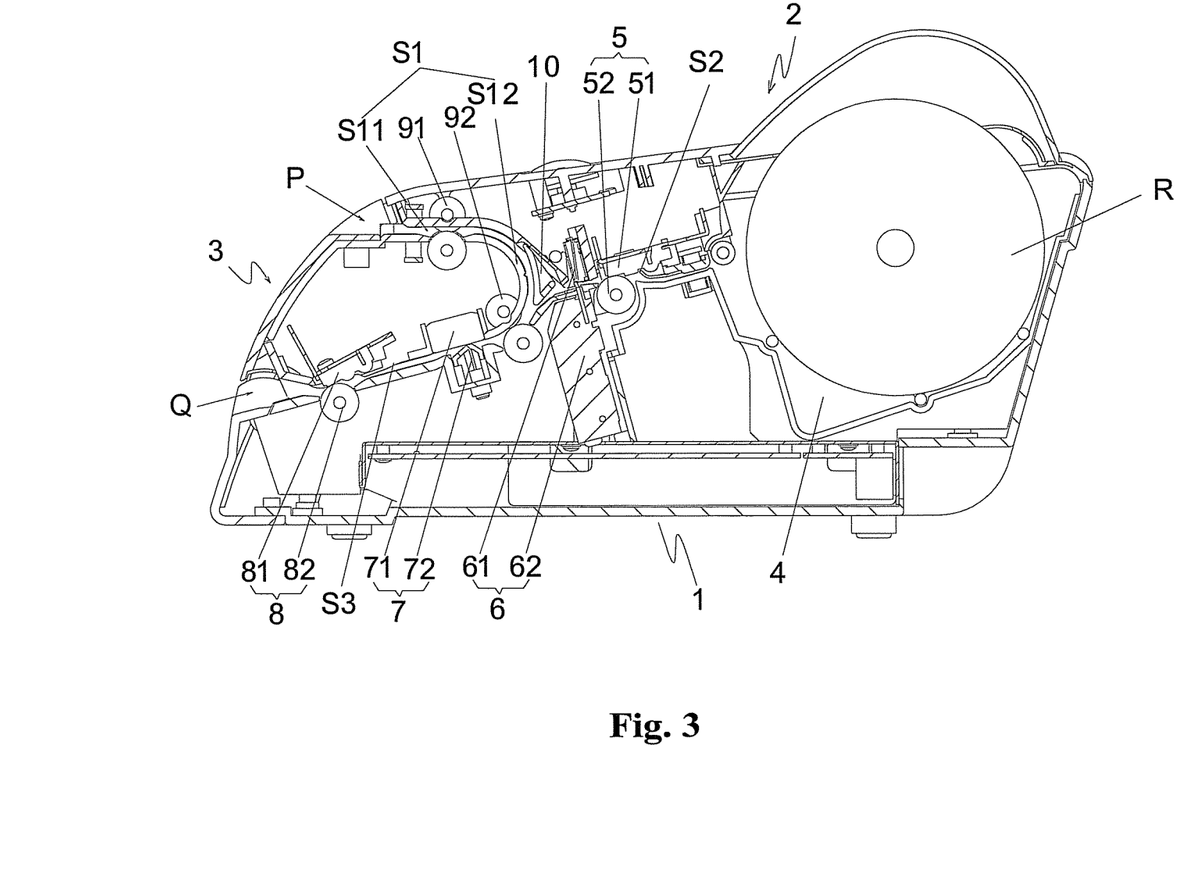
FIG. 3 is a longitudinal profile view of the scanning-printing integrated machine shown in FIG. 2.
Figure 4:
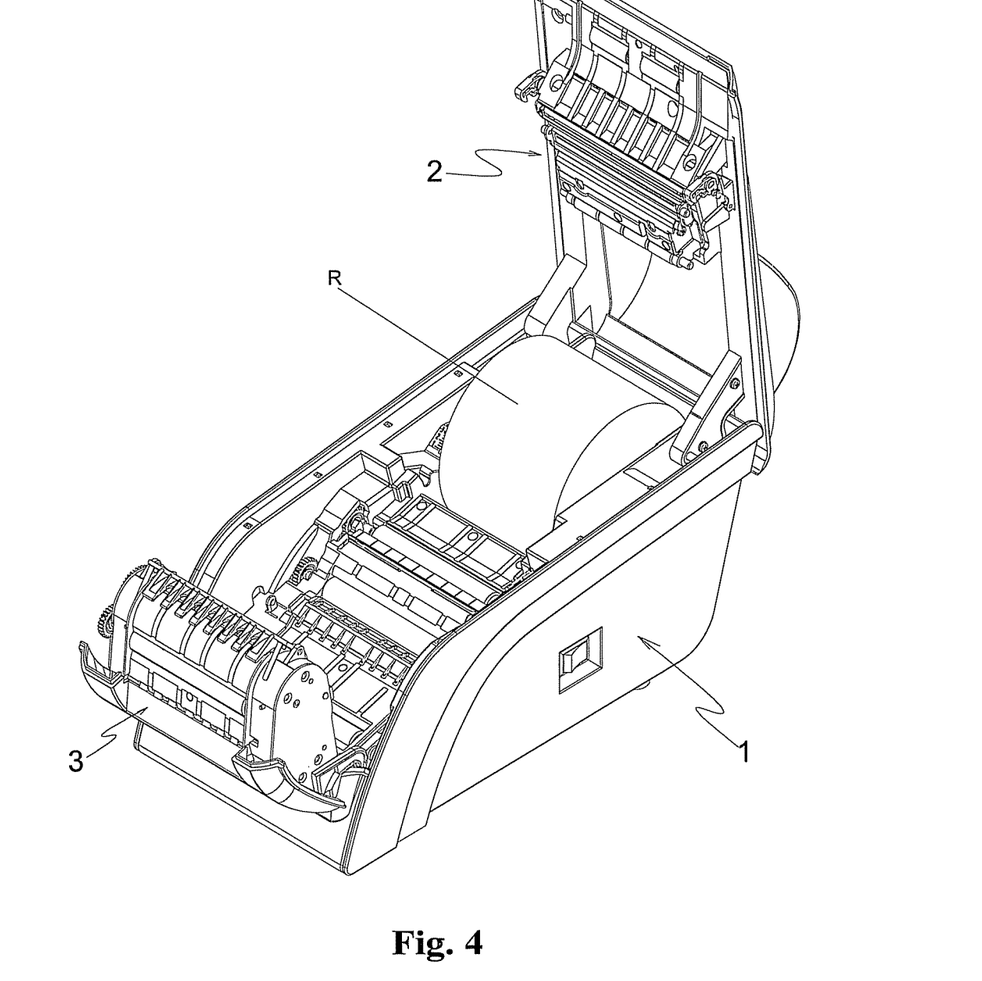
FIG. 4 is a schematic view of the scanning-printing integrated machine in an open state according to one embodiment of the invention.

With reference to FIG. 2 to FIG. 4, the scanning-printing integrated machine of the invention comprises a lower machine body 1, an upper cover, i.e., a second cover 2, and a front cover, i.e., a first cover 3. Wherein, the second cover 2 is hinged with one end of the lower machine body 1 and may be opened and closed with respect to the lower machine body 1; the first cover 3 is hinged with the other end of the lower machine body 1 and may be opened and closed with respect to the lower machine body 1. A paper house 4 is formed between the second cover 2 and the lower machine body 1, which is used to store rolled printing medium R.

When the second cover 2 and the first cover 3 are closed with respect to the lower machine body 1, a first passage S1 is formed between the second cover 2 and the first cover 3, a second passage S2 is formed between the second cover 2 and the lower machine body 1, and a third passage S3 is formed between the first cover 3 and the lower machine body 1.

A paper feed end of the first passage S1 is connected with a paper inlet P, a paper discharge end of the first passage S1 is connected with a paper feed end of the third passage S3, and a paper discharge end of the third passage S3 is connected with a paper outlet Q. A paper feed end of the second passage S2 is connected with the paper house 4, and a paper discharge end of the second passage S2 is connected with the paper feed end of the third passage S3.

The first cover is hinged at the front side of the lower machine body, the second cover is hinged at the back side of the lower machine body, and the second cover partially extends on the top of the first cover. The first passage S1 comprises a substantially horizontal extended segment S11 and an arc extended segment S12 which extends and transits towards the third passage S3, that is, the paper feed direction of a paper inlet of the first passage S1 is substantially parallel to a paper discharge direction of the paper outlet of the third passage S3, the paper inlet and the paper outlet are located in the front side of the scanning-printing integrated machine, which is convenient for the operator to insert and receive the medium.

Figure 9:
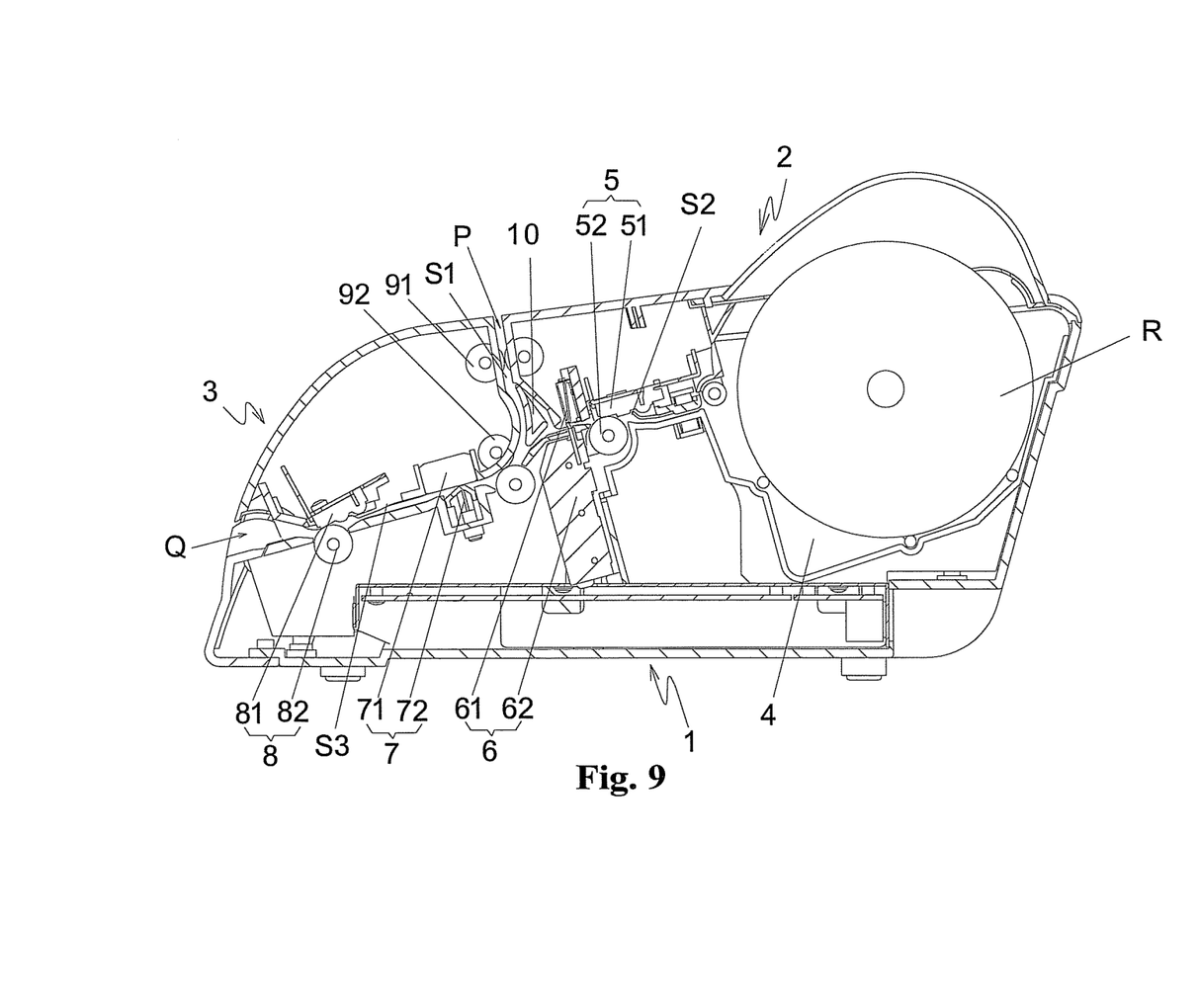
FIG. 9 is a longitudinal profile view of a scanning-printing integrated machine according to another embodiment of the invention.

In another embodiment of the invention, as shown in FIG. 9, the first cover is hinged at the front side of the lower machine body, the second cover is hinged at the back side of the lower machine body, an end face of the first cover is opposite to an end face of the second cover, and the external paper inlet P of the first passage formed between the first cover and the second cover is located on the upper surface of the machine.

Figure 10:
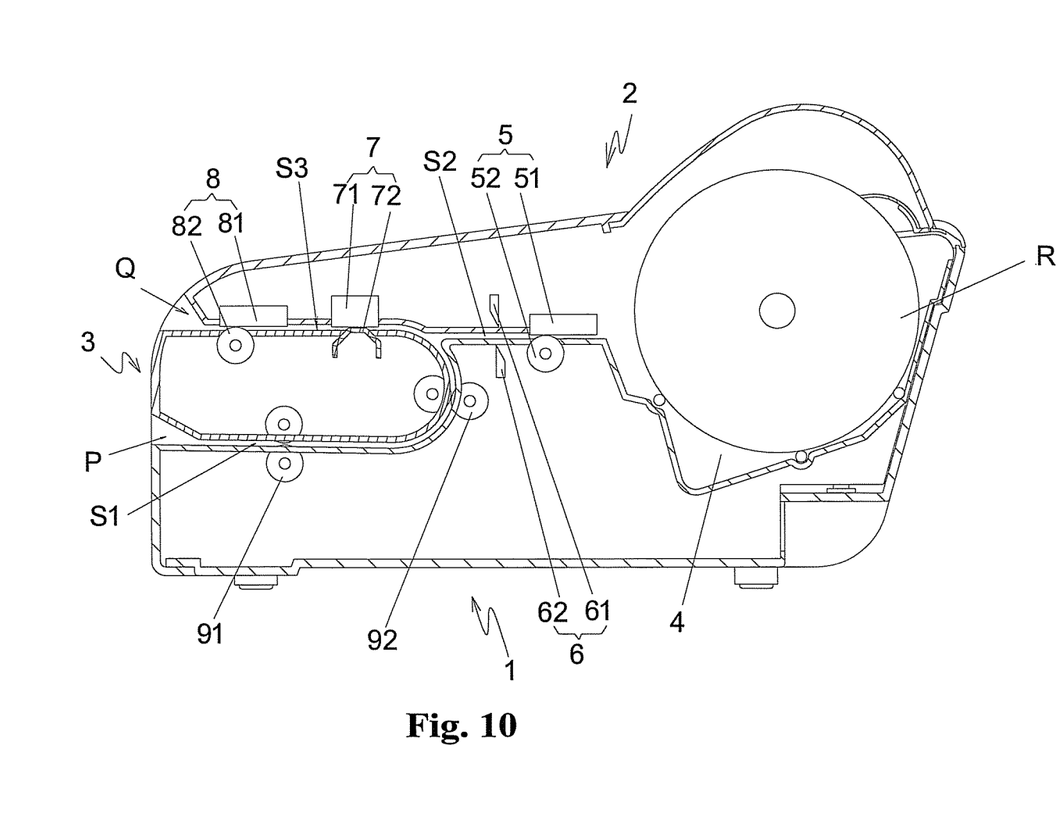
FIG. 10 is a longitudinal profile view of a scanning-printing integrated machine according to still another embodiment of the invention.

In still another embodiment of the invention, as shown in FIG. 10, when the second cover 2 and the first cover 3 are closed with respect to the lower machine body 1, a third passage S3 is formed between the second cover 2 and the first cover 3, a second passage S2 is formed between the second cover 2 and the lower machine body 1, and a first passage S1 is formed between the first cover 3 and the lower machine body 1. In this embodiment, the first cover is hinged at the front side of the lower machine body, the second cover is hinged at the back side of the lower machine body, wherein the second cover partially extends on the top of the first cover, or an end face of the first cover is opposite to an end face of the second cover, and the external paper inlet P of the first passage formed between the first cover and the second cover is located on the upper surface of the machine.

Paper delivery rollers, which are used for driving the medium inserted from the paper inlet to move within the first passage, are arranged in the first passage S1. The amount of the paper delivery roller is pairs or one pair, that is, at least one pair of the paper delivery rollers. In the embodiment as shown in FIG. 3, there is a pair of delivery rollers 91, and in the embodiment as shown in FIG. 10, there are two pairs of delivery rollers 91 and 92.

The second passage S2 comprises a first printing mechanism 5 and a paper cutting mechanism 6, along with the forward direction of the printing medium, the paper cutting mechanism is located in the downstream of the first printing mechanism. It should be noted that, the paper cutting mechanism also may be located in the upstream of the first printing mechanism, it can also achieve paper cutting operation.

Wherein, the first printing mechanism 5 is used for printing set images and characters on the printing medium, the paper cutting mechanism 6 is used for cutting the printing medium to make the printing medium separated from the paper roll. In the embodiment, the first printing mechanism 5 is a thermal printing mechanism comprising a thermal print head 51 and a roller 52 which are arranged oppositely.

When printing, the printing medium R passes between the thermal print head 51 and the roller 52, the roller 52 supports and drives the printing medium R to move towards the downstream of the first printing mechanism coordinating with the thermal print head 51, so that the thermal print head 51 prints images or characters on the printing medium R continuously.

Of course, the first printing mechanism 5 also may be other type of printing mechanisms, such as laser printing mechanism, dot-matrix printing mechanism or inkjet printing mechanism. The paper cutting mechanism 6 comprises a fixed blade 61 and a movable blade 62 which are arranged oppositely. The printing medium R passes between the fixed blade 61 and the movable blade 62, and the movable blade 62 makes reciprocal linear motion with respect to the fixed blade 61 to cut the printing medium R and make it separated from the paper roll.

The third passage S3 comprises a scanning mechanism 7 and a second printing mechanism 8, along with the forward direction of the medium (printing medium or scanning medium), the second printing mechanism 8 is located in the downstream of the scanning mechanism 7.

The scanning mechanism 7 comprises optical devices 71 which are arranged oppositely. The optical devices 71 may be contact image sensor CIS, may be other optical devices that can collect image information of the medium, such as charge-coupled image sensor CCD.

When the optical devices 71 are contact image sensor CIS, the scanning mechanism 7 further comprises a paper pressing element 72 which is arranged in opposite to the optical devices 71. The paper pressing element 72 is closely contacted with the optical devices 71, the medium passes between the paper pressing element 72 and the optical devices 71, and the optical devices 71 can complete the collection of images of the medium surface.

The second printing mechanism 8 may be a thermal printing mechanism, and also may be other printing mechanisms, such as laser printing mechanism, dot-matrix printing mechanism or inkjet printing mechanism.

In the embodiment, the second printing mechanism 8 is a thermal printing mechanism comprising a thermal print head 81 and a roller 82 that are arranged oppositely. When printing, the medium passes between the thermal print head 81 and the roller 82, the roller 82 supports and drives the medium to move towards the downstream of the printing mechanism coordinating with the thermal print head 81, so that the thermal print head 81 prints images or characters on the medium continuously.

Preferably, a paper delivery roller is further arranged in the third passage S3 to drive the medium to move in the third passage.

Preferably, the thermal print head 51 of the first printing mechanism 5 is arranged on one of the second cover 2 and the lower machine body 1, the roller 52 is arranged on the other of the second cover 2 and the lower machine body 1. In the embodiment, the thermal print head 51 is arranged on the second cover 2, the roller 52 is arranged on the lower machine body 1, of course, the positions thereof can be swapped.

The fixed blade 61 of the paper cutting mechanism 6 is arranged on one of the second cover 2 and the lower machine body 1, and the movable blade 62 is fixed on the other of the second cover 2 and the lower machine body 1.

The optical devices 71 of the scanning mechanism 7 are arranged on one of the first cover 3 and the lower machine body 1, and the paper pressing element 72 is arranged on the other of the first cover 3 and the lower machine body 1.

The thermal print head 81 of the second printing mechanism 8 is arranged on one of the first cover 3 and the lower machine body 1, and the roller 82 is arranged on the other of the first cover 3 and the lower machine body 1.

In this way, when the second cover 2 is opened with respect to the lower machine body 1, the first passage S1 and the second passage S2 are open, and the paper house 4 is exposed entirely in order to do convenient operation of cleaning the passages, dealing with the blockage of paper, and replacing the printing medium and so on. When the first cover 3 is opened with respect to the lower machine body 1, the third passage S3 is open in order to do convenient operation of cleaning the passages, dealing with the blockage of paper and so on.

Preferably, a guide plate 10 hinged with the first cover 3 is also arranged at the cross of the first passage S1, the second passage S2 and the third passage S3.

Figure 5:
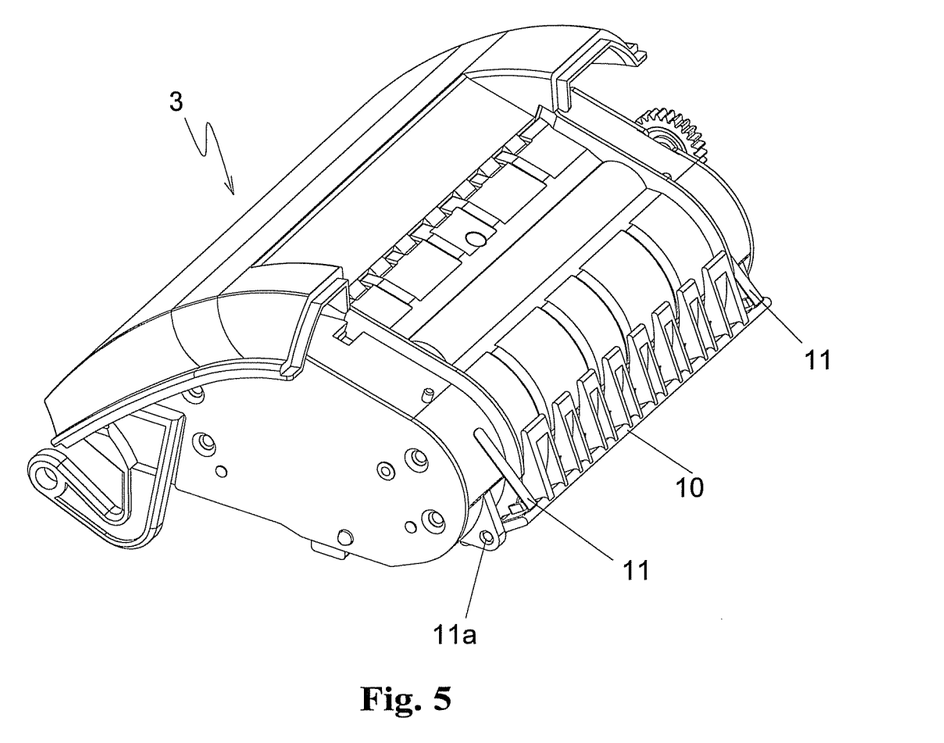
FIG. 5 is a schematic view of a first cover of the scanning-printing integrated machine according to one embodiment of the invention.
Figure 6:
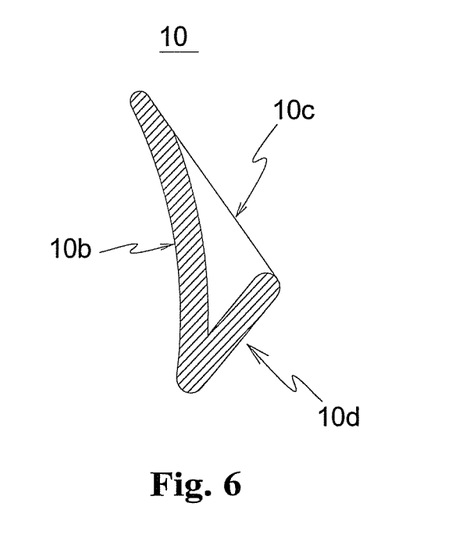
FIG. 6 is a sectional view of a guide plate on the first cover shown in FIG. 5.

As shown in FIG. 5 and FIG. 6, the guide plate 10 is hinged with the first cover 3 via rotation shafts 11a arranged at the two ends of the guide plate, the guide plate is substantially a trihedron having a first side face 10b, a second side face 10c and a third side face 10d.

An elastic supporter 11 is also arranged between the first side face 10b of the guide plate 10 and the first cover 3, one end of the elastic supporter 11 is connected with the guide plate 10, and the other end thereof is connected with the first cover 3, under the elastic force of the elastic supporter 11, a set distance is kept between the first side face of the guide plate 10 and the first cover 3, so that the scanning medium can be guided through therebetween.

When the second cover 2 and the first cover 3 are closed with respect to the lower machine body 1, the second side face 10c of the guide plate 10 is closely contacted with the second cover 2 under the elastic force of the elastic supporter 11, and a set distance is kept between the third side face 10d of the guide plate 10 and the lower machine body 1, so that the printing medium can be guided through therebetween.

When it is necessary to replace the printing medium, open the second cover 2, put the rolled paper into the paper house 4, simultaneously, put the free end of the roller paper on the exposed face of the first cover 3, and then close the second cover, and make the printing medium located between the second side face of the guide plate 10 and the second cover 2. Under the pressure of the printing medium, the guide plate 11 overcomes the elastic force of the elastic supporter 11 and has the tendency to rotate towards the first cover 3 around the rotation shaft 11a.

In this way, the printing medium is driven into the second passage S2, the printing medium pulled out returns to the paper house, and the front end of the printing medium is rightly located at the printing location of the first printing mechanism. Therefore, it is only needed to open the second cover 2 to complete the operation of replacing the printing medium. In addition, because the guide plate 10 is movable with respect to the second cover 2, the free end of the rolled paper passes between the guide plate 10 and the second cover 2, the resistance of the printing medium by a sharp corner of the guide plate 10 is avoided, so that the medium can return to the paper house without any obstacle, the motion is more smooth.

The scanning-printing integrated machine further comprises a control device, the control device comprises a first printing mechanism control module, a cutter control module, a scanning mechanism control module, a medium validity judgment module and a second printing mechanism control module.

Wherein, the first printing mechanism control module is used to control the first printing mechanism to print the set images or characters on the printing medium according to the received printing data; the cutter control module is used to control the cutter mechanism to cut the printing medium to make the printing medium separated from the paper roll according to the received paper cutting control instructions; the scanning mechanism control module is used to control the scanning mechanism to collect images of the medium input from the scanning passage or the medium input from the printing passage; the medium validity judgment module is used to judge the validity of the medium according to the medium images collected by the scanning mechanism and reference data (for example, data of the winning lottery ticket or received printing data).

Wherein, the judgment of validity of the medium comprises: judgment of validity of the medium input from the scanning passage (for example, whether it wins) and judgment of validity of the medium input from the printing passage (for example, whether it is printed completely); the second printing mechanism control module controls the second printing mechanism to execute printing operation according to the judgment result of the medium validity judgment module.

It should be noted that, the medium validity judgment module of the control device could be integrated with other control modules and located inside the scanning-printing integrated machine, and also could be independently arranged outside the scanning-printing integrated machine and connected with other control modules via a communication module.

When the medium validity judgment module is located outside the scanning-printing integrated machine, for example, located in an external control device (for example, host) connected with the scanning-printing integrated machine, the scanning mechanism control module transmits the collected images of the medium input from the scanning passage or the medium input from the printing passage to the medium validity judgment module via the communication module. The medium validity judgment module judges the validity of the medium according to the medium images collected by the scanning mechanism and the reference data, and feeds the judgment result back to the second printing mechanism control module via the communication module, so that the second printing mechanism control module controls the second printing mechanism to execute the printing operation according to the judgment result of the medium validity judgment module.

The working principle of the scanning-printing integrated machine of the invention used for lottery ticket printing and cashing will be briefly described below.

The Operation Process of Cashing

When the scanning-printing integrated machine is executing the operation of cashing, the lottery ticket to be cashed is first inserted into the first passage S1 from the paper inlet P. Under the drive of the paper delivery rollers, the lottery ticket enters the third passage S3 from the first passage S1. After entering the third passage S3, the lottery ticket first enters the scanning mechanism 7 in the third passage S3, the optical devices 71 collect images of the lottery ticket surface and send the collected data to the control device (not shown) for comparison.

Then, the scanned lottery ticket enters the second printing mechanism 8 in the third passage S3. After the comparison of the scanning information is successful, the control device controls the second printing mechanism to print mark information, such as "Cashed" or "Invalidated", on the scanned lottery ticket to prevent the ticket paper from being reused, and the printed lottery ticket is discharged from the paper outlet Q.

The Operation Process of Printing

When the scanning-printing integrated machine is executing the operation of printing, the printing medium R enters the second passage S2 from the paper house 4, passes through the first printing mechanism 5 and the paper cutting mechanism 6, and then enters the third passage S3. The thermal print head 51 of the first printing mechanism 5 prints the set images or characters on the printing medium R, then the printed printing medium enters the scanning mechanism 7 in the third passage S3, the optical devices 71 collect images of the printed printing medium surface and send the collected data to the control device for comparison.

Then, the printed printing medium enters the second printing mechanism 8 in the third passage S3. When the data collected by the optical devices 71 is consistent with the printing data received by the control device, it is indicated that the printed contents of the ticket paper is integral, and the second printing mechanism 8 does not act or prints a mark to indicate that the ticket paper is printed integrally, and the printed ticket paper is cut by the paper cutting mechanism 6 and then discharged from the paper outlet Q.

When the data collected by the optical devices 71 is inconsistent with the printing data received by the control device, it is indicated that the printed contents of the ticket is not integral, the second printing mechanism 8 prints an "Invalidated" mark on the ticket paper to prevent the ticket from being used illegally; the control device can notify the host to record the printing failure or to reprint the ticket paper. After printing is completed, the printing medium returns to the second passage.

Figure 7:
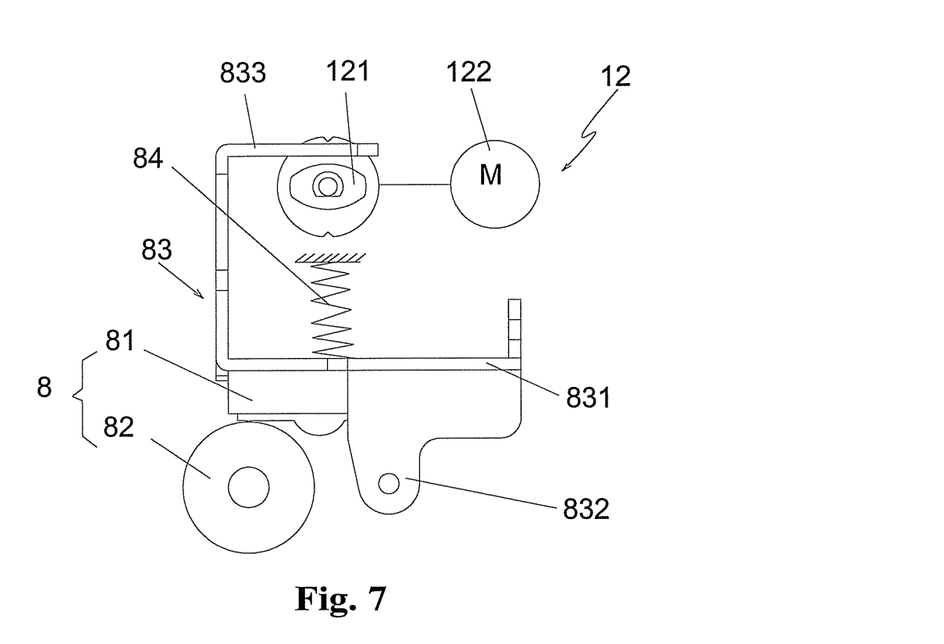
FIG. 7 is a schematic view of a print head raising mechanism of the scanning-printing integrated machine according to one embodiment of the invention in a first state, wherein the lap between a low point of the cam and a bracket is shown.
Figure 8:
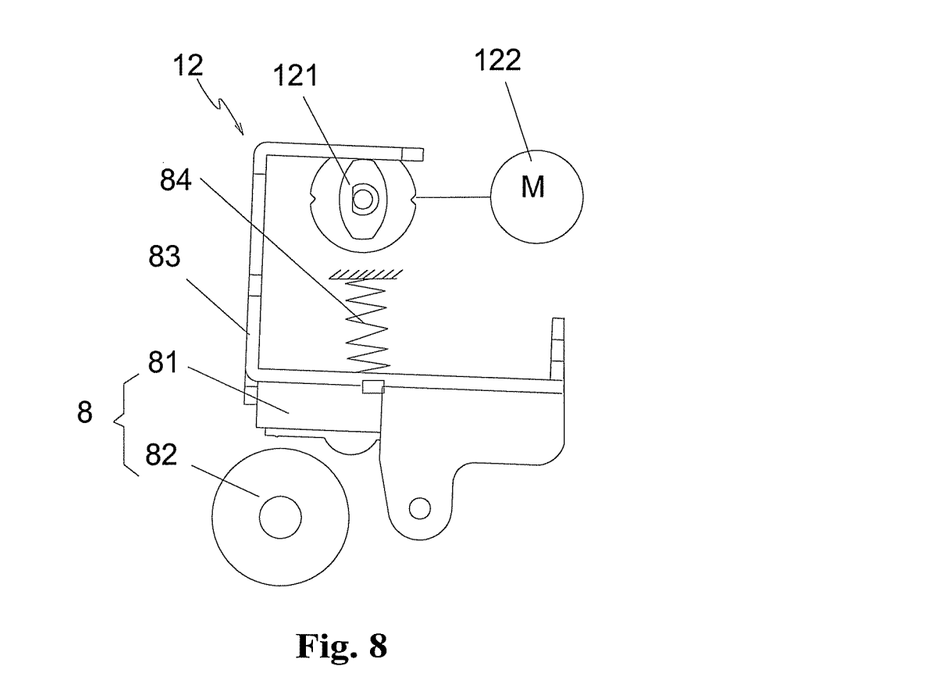
FIG. 8 is a schematic view of a print head raising mechanism of the scanning-printing integrated machine according to one embodiment of the invention in a second state, wherein the lap between a high point of the cam and a bracket is shown.

Preferably, a print head raising mechanism 12 is also arranged in the scanning-printing integrated machine. As shown in FIG. 7 and FIG. 8, the print head raising mechanism 12 is connected with the second printing mechanism 8 and comprises a cam 121 and a motor 122. The print head 81 is fixed on a bracket 83, the cam 121 is lapped with the bracket 83, the motor 122 is in transmission connection with the cam 121, and the cam 121 can be driven to rotate by the motor 122.

Wherein, the bracket 83 comprises a mounting base 831 hinged with the first cover via a pivoting portion 832 and a driving plate 833 that extends on the top of the mounting base 831 and is in transmission fit with the cam 121. A press spring 84 is arranged on the mounting base 831, and the bottom of the mounting base is used for mounting the print head 81 of the second printing mechanism.

When the motor 122 drives the cam 121 to rotate to a first set position, as shown in FIG. 7, the low point of the cam 121 is lapped with the bracket 83, the print head 81 of the second printing mechanism is tangent to and closely contacted with the roller 82, at this time, the print head 81 of the second printing mechanism may print on the printing medium.

When the motor 122 drives the cam 121 to rotate to a second set position, as shown in FIG. 8, the high point of the cam 121 is lapped with the bracket 83, the print head 81 of the second printing mechanism is separated from the roller 82, a gap is formed between the print head and the roller, so that the medium may smoothly pass through without any friction with the print head of the second printing mechanism.

Therefore, when the print head of the second printing mechanism needs to work, the print head of the second printing mechanism is contacted with the roller via the print head raising mechanism to execute printing; when the print head of the second printing mechanism does not need to work, the print head of the second printing mechanism is separated from the roller via the print head raising mechanism, friction to the print head of the second printing mechanism during the medium delivery process is reduced, so that the reliability of the print head is improved.

It should be noted that, the scanning-printing integrated machine of the invention can achieve functions of scanning, scanning after printing, printing after scanning, and printing after scanning after printing, therefore, it is not limited to such application although it is typically used for lottery ticket printing and cashing.

Above contents are only preferred embodiments of the disclosure and are not used for limiting the disclosure. For persons skilled in the field, the disclosure may have various alternations and changes. Any modifications, equivalent replacements and improvements within the spirit and principle of the disclosure should be contained within the protection scope of the disclosure.

What is claimed is:

1. A scanning-printing integrated machine, comprising a first passage connected with an external paper inlet, a second passage connected with a paper house, a third passage connected with a paper outlet, and a control device, wherein a paper outlet of the first passage and a paper outlet of the second passage meet together at the third passage, wherein,
    at least one pair of delivery rollers is arranged in the first passage,
    a first printing mechanism and a paper cutting mechanism are arranged in the second passage,
    a scanning mechanism and a second printing mechanism for printing mark information on a medium are arranged in sequence in the third passage,
    wherein the control device judges the validity of the medium according to medium images collected by the scanning mechanism, and controls the printing operation of the second printing mechanism according to the judgment result.

2. The scanning-printing integrated machine according to claim 1, wherein the scanning-printing integrated machine further comprises a lower machine body, a first cover hinged at the front side of the lower machine body and a second cover hinged at the back side of the lower machine body, wherein the first passage is formed between the first cover and the second cover, the second passage is formed between the second cover and the lower machine body, and the third passage is formed between the first cover and the lower machine body.

3. The scanning-printing integrated machine according to claim 2, wherein a portion of the second cover extends on the top of the first cover.

4. The scanning-printing integrated machine according to claim 3, wherein the first passage comprises a substantially horizontal extended segment and an arc extended segment which extends and transits towards the third passage, and the third passage obliquely extends downwards.

5. The scanning-printing integrated machine according to claim 2, wherein an end face of the first cover is opposite to an end face of the second cover, and an external paper inlet of the first passage formed between the first cover and the second cover is located on an upper surface of the machine.

6. The scanning-printing integrated machine according to claim 2, wherein a guide plate is arranged at a meeting place of the first passage, the second passage and the third passage, wherein the guide plate has a first side face apart from the first cover at an interval, a second side face contacting with the second cover, and a third side face apart from the lower machine body at an interval.

7. The scanning-printing integrated machine according to claim 6, wherein the guide plate is hinged at the first cover and an elastic supporter is arranged between the guide plate and the first cover.

8. The scanning-printing integrated machine according to claim 7, wherein the elastic supporter is a spring leaf fixedly mounted on the guide plate.

9. The scanning-printing integrated machine according to claim 2, wherein the scanning-printing integrated machine further comprises a print head raising mechanism of the second printing mechanism, the print head raising mechanism comprises a bracket movably connected with the first cover and a driving mechanism for driving the bracket to move, wherein the print head of the second printing mechanism is fixedly mounted on the bracket.

10. The scanning-printing integrated machine according to claim 9, wherein the bracket comprises a print head mounting base hinged at the first cover and a driving plate extending on the top of the print head mounting base, and the driving mechanism comprises a cam in transmission fit with the driving plate and a driving motor.

11. The scanning-printing integrated machine according to claim 1, wherein the scanning-printing integrated machine further comprises a lower machine body, a first cover hinged at the front side of the lower machine body and a second cover hinged at the back side of the lower machine body, wherein the first passage is formed between the first cover and the lower machine body, the third passage is formed between the second cover and the first cover, and the second passage is formed between the second cover and the lower machine body.

12. The scanning-printing integrated machine according to claim 1, wherein the control device comprises a medium validity judgment module which is located outside the scanning-printing integrated machine and used for judging whether the medium is valid.

* * * * *